April 11, 1967
G. RITCHIE
3,313,671
TENSIONED STRAND TYPE DUCT FORMING MECHANISM
Filed July 22, 1963
4 Sheets-Sheet 1
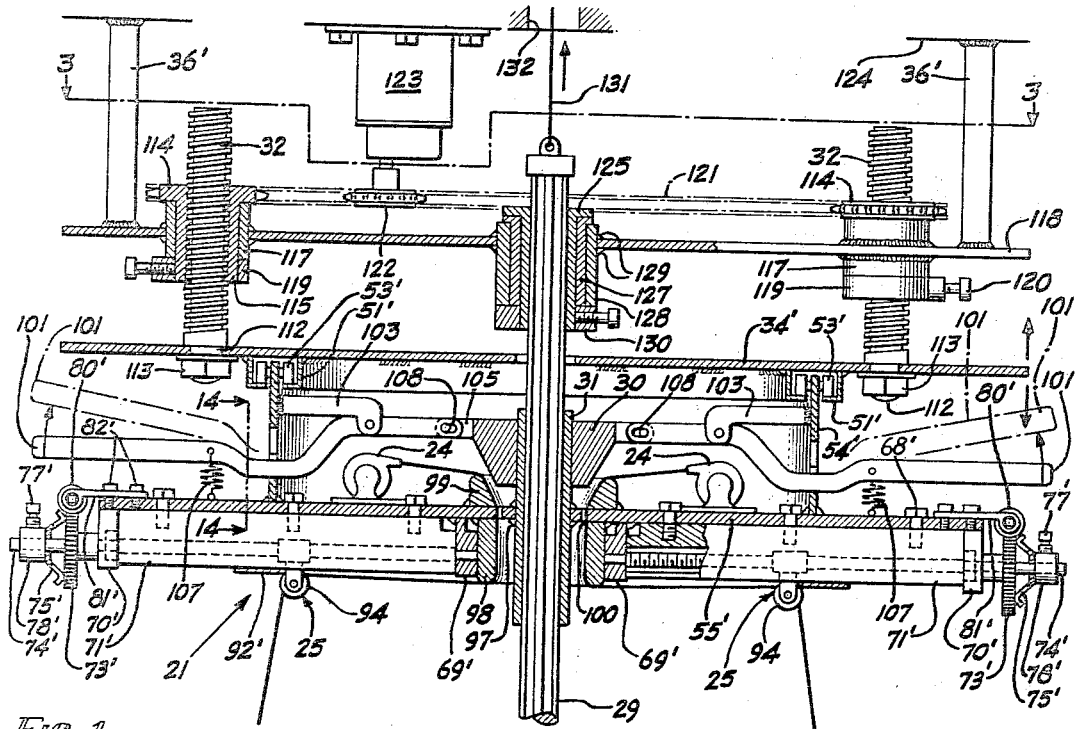
FIG. 1.
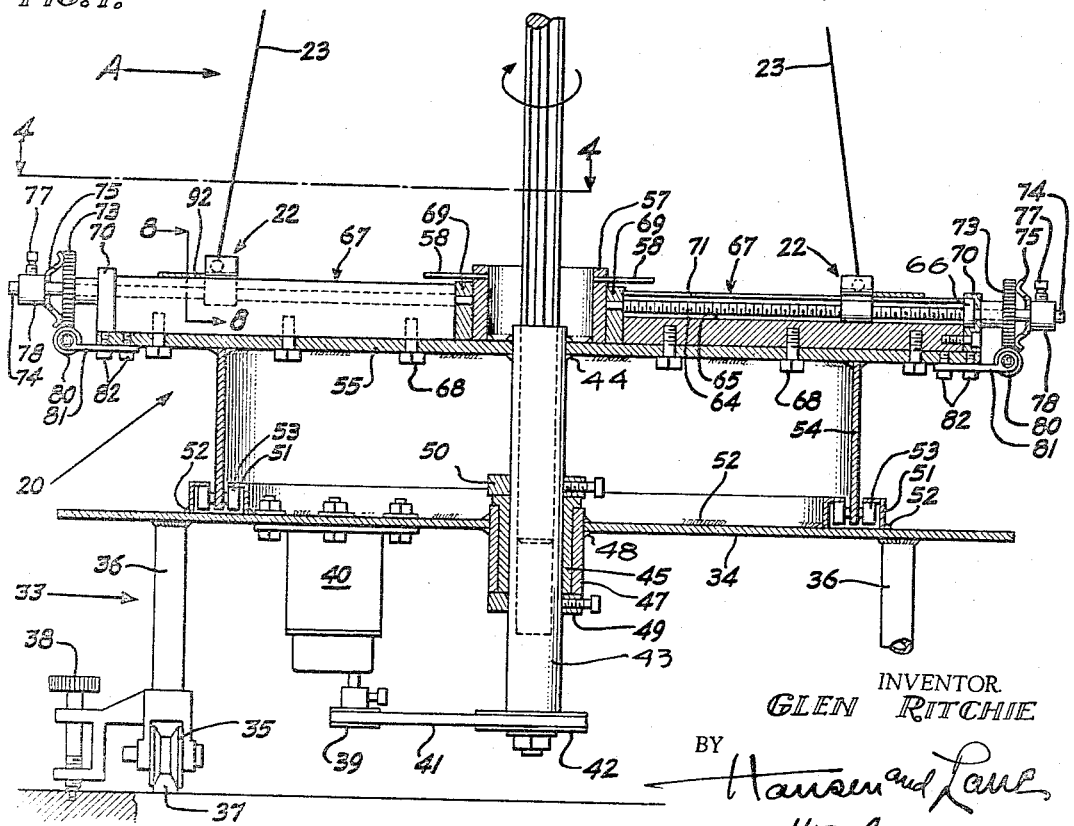
INVENTOR.
GLEN RITCHIE
BY
Hansen and Lane
HIS ATTORNEYS.

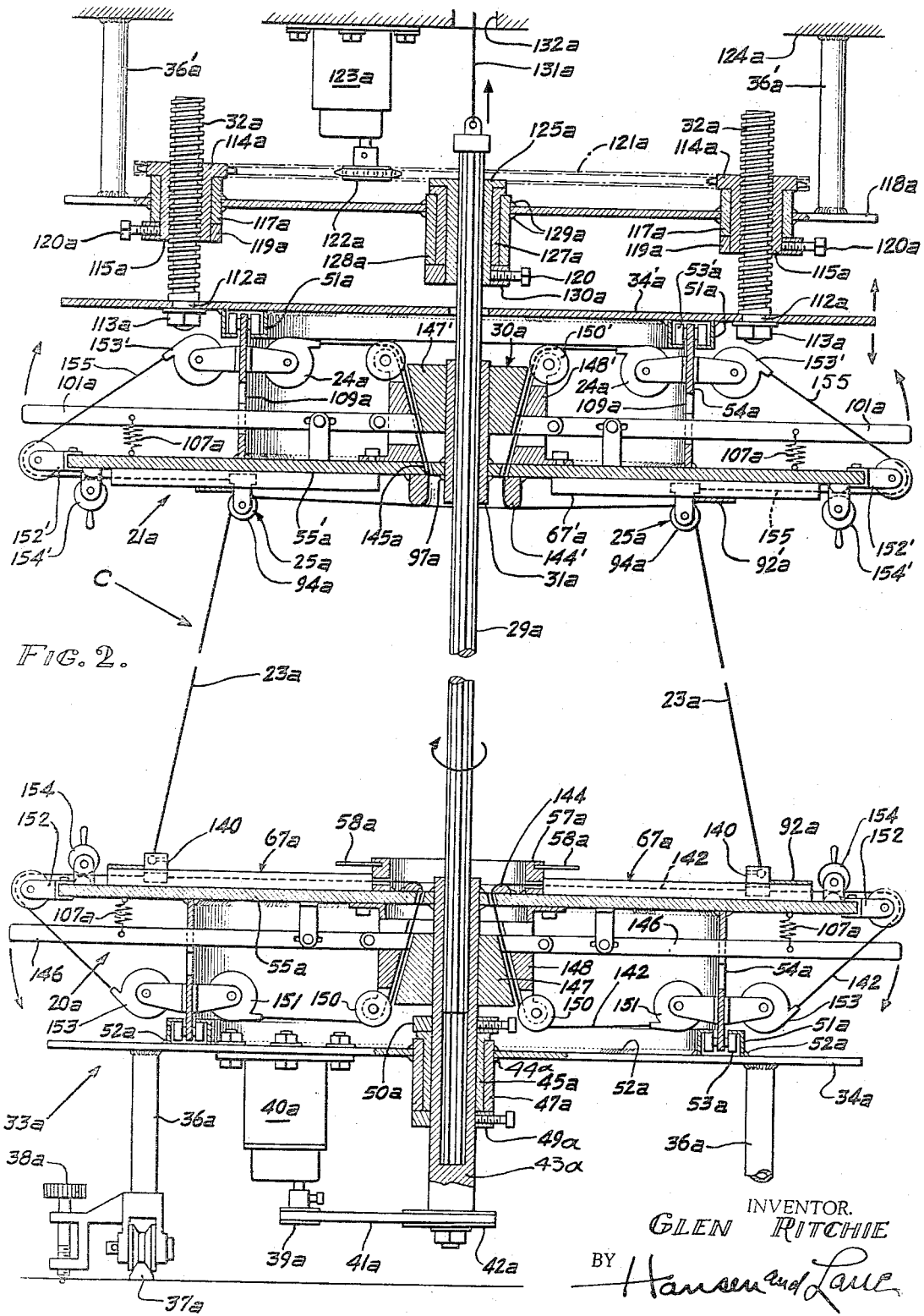

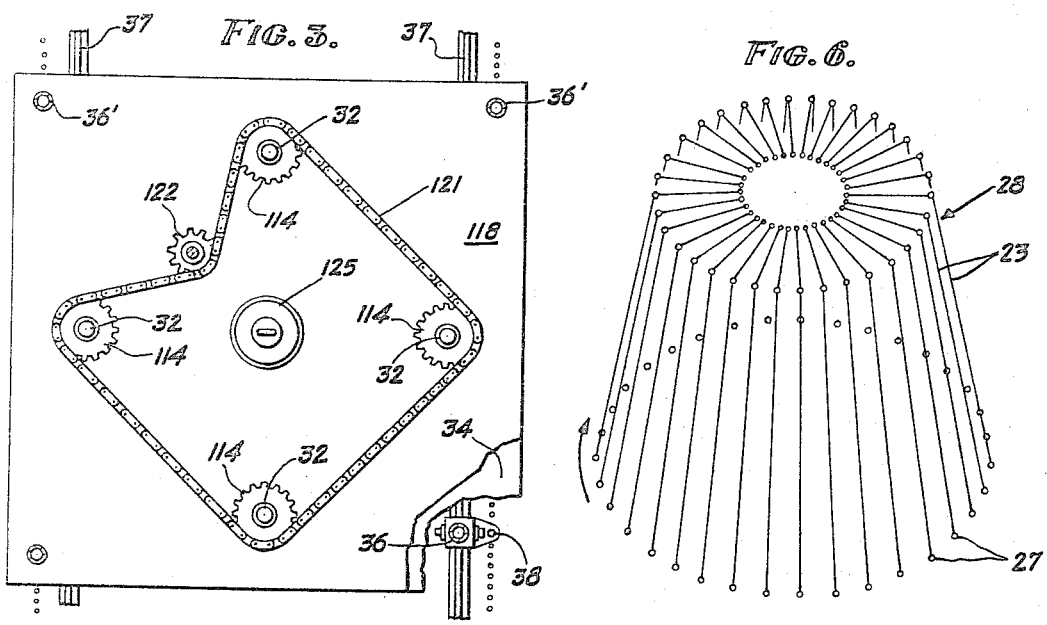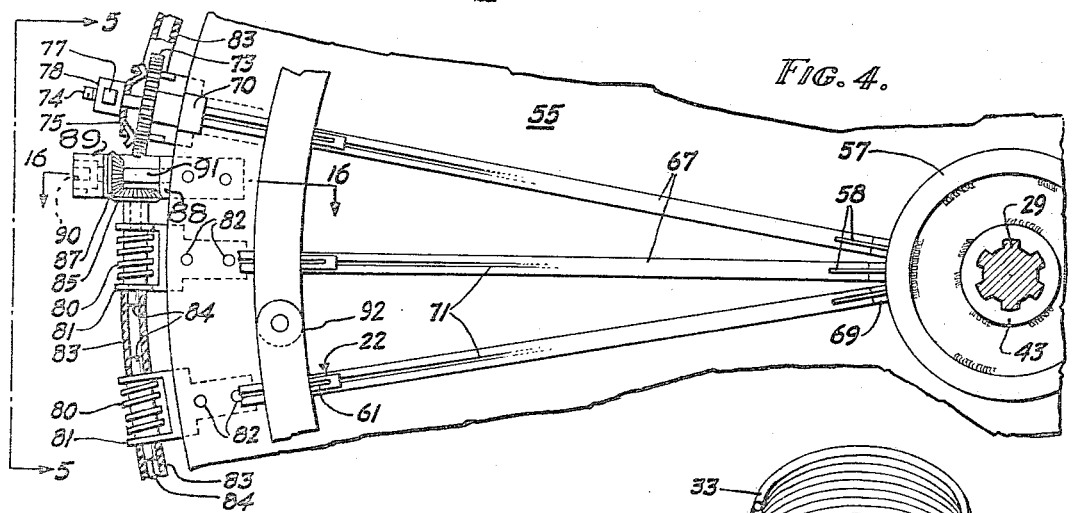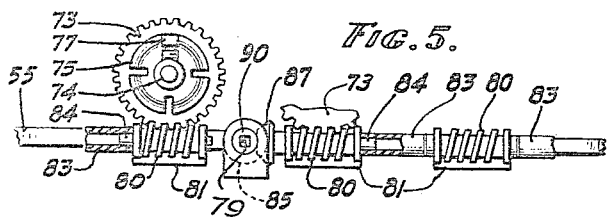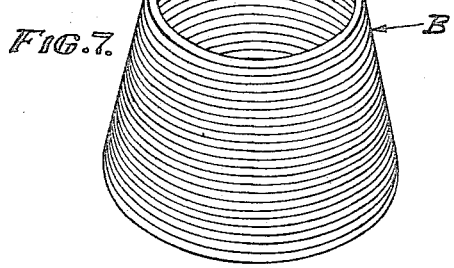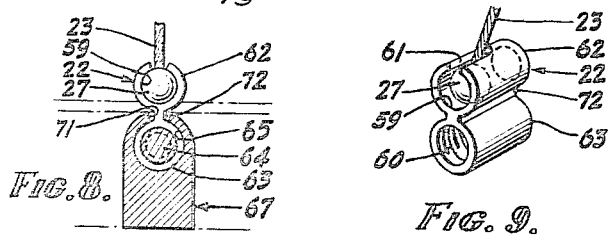

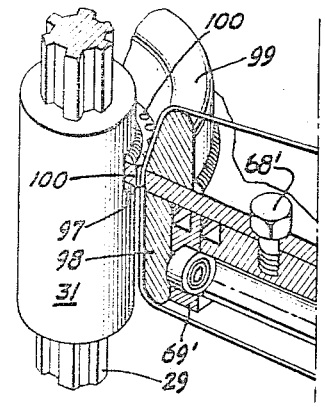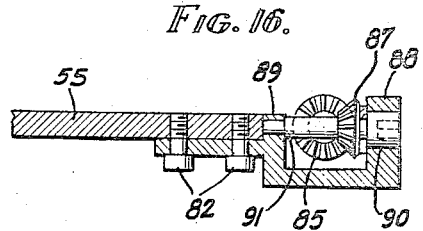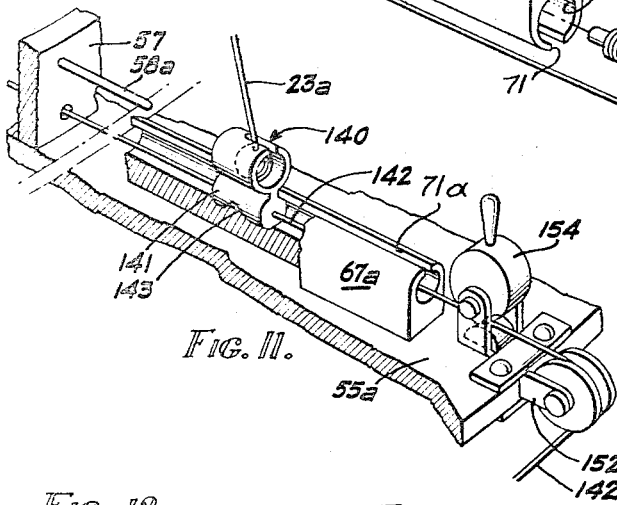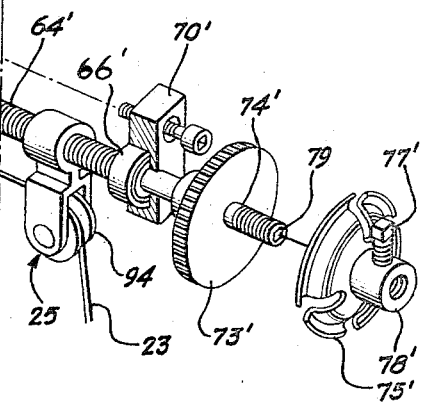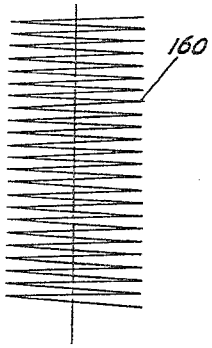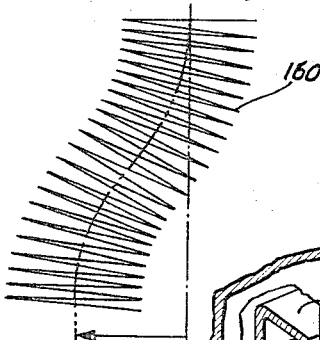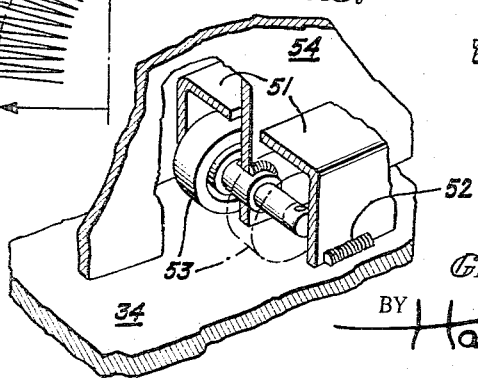

United States Patent Office 3,313,671
Patented Apr. 11, 1967

3,313,671
TENSIONED STRAND TYPE DUCT FORMING
MECHANISM
Glen Ritchie, 13209 Quito Road,
Saratoga, Calif. 95070
Filed July 22, 1963, Ser. No. 296,647
12 Claims. (Cl. 156—425)

The present invention relates to duct forming mechanism, and pertains more particularly to a mechanism wherein a plurality of strands are extended under tension to define a duct shape, whereon a layer of settable or hardenable duct forming material may be applied to form a duct section.

In many crafts and industries, such as, for example, heating, air conditioning, aircraft, rockets, and many others, a wide and increasing variety of ducts are employed. The manufacture of such ducts frequently requires the use of special materials and complex forms and sections, which are difficult and expensive to make. This is particularly true of joints and other sections which may have a different diameter on one end thereof from that on the other, and wherein the shape at one end thereof also may be different from that at the other end.

The present invention provides a duct forming mechanism for supporting a large plurality of strands to define a duct shape, each end of each of the strands being adjustable toward and away from a common axis, so that when the strands are placed under tension, and duct forming material is wound, or otherwise applied, over the strands, a duct section having the shape defined by the strands is formed thereon, after which the strands are removed from the duct section thus formed to free the latter for removal.

Another object of the invention is to provide a pair of strand supporting members which preferably are rotatable about a common axis, each of the strand supporting members having a large plurality of radially adjustable, strand retaining members thereon, the strand retaining members on one strand supporting member being paired with those on the other strand supporting member, a strand being provided for extending between each pair of strand retaining members, means also being provided for clamping the strand retaining members in adjusted position to define a duct shape, and for placing the strands under tension, thereby to support a layer of duct forming material wound on or otherwise applied over the strands, preferably during synchronous rotation of the strand supporting members.

A further object of the invention is to provide an improved duct forming mechanism wherein a plurality of tensioned strands are positioned to define a duct shape.

These, and other objects and advantages of the invention, will be apparent from the following description and the accompanying drawings, wherein:

FIG. 1 is an axial, sectional view of a duct forming mechanism embodying the invention.

FIG. 2 is a sectional view, generally similar to FIG. 1, but showing a modified form of the invention.

FIG. 3 is a transverse sectional view in reduced scale taken along line 3—3 of FIG. 1.

FIG. 4 is an enlarged, fragmentary, sectional view taken along line 4—4 of FIG. 1.

FIG. 5 is an elevational view looking in the direction of the arrows 5—5 in FIG. 4.

FIG. 6 is a diagrammatic, perspective view in reduced scale showing the strands of the mechanism illustrated in either FIGS. 1 or 2 arranged to define a truncated, conical section.

FIG. 7 is a perspective view in further reduced scale showing a duct section as it would appear after having been formed by winding a strand of duct forming material on the cables arranged as in FIG. 7.

FIG. 8 is an enlarged, fragmentary, sectional view taken along line 8—8 of FIG. 1.

FIG. 9 is a similarly enlarged perspective view showing one of the ball end retaining members with a ball end member retained therein.

FIG. 10 is an enlarged, fragmentary, partially exploded, perspective view of a radial fragment of the upper strand positioning member of FIG. 1, portions thereof being shown in section, other portions being broken away.

FIG. 11 is a slightly enlarged, perspective view of a radial fragment of the lower strand supporting member of FIG. 2, portions being broken away.

FIG. 12 is a side elevational view of an open helix wound on the strands of a duct forming mechanism embodying the invention with the strands positioned to define a cylinder.

FIG. 13 is a view similar to FIG. 14, but with the ends of the helix offset laterally from each other.

FIG. 14 is an enlarged, fragmentary, sectional view taken along line 14—14 of FIG. 1.

FIG. 15 is an enlarged, fragmentary, perspective view of a portion of the circular base track with the rollers of the cylindrical support of the lower cable supporting member riding thereon.

FIG. 16 is an enlarged, fragmentary, sectional view taken along lines 16—16 of FIG. 4.

Briefly, the form A of the invention shown in FIG. 1 comprises a pair of co-axial, rotary, strand supporting members 20 and 21. Although the axial position of these members is not a feature of the invention, they will be described herein in axially upright position as they appear in FIGS. 1 and 2.

The lower strand supporting member 20 is provided with a large plurality of radially adjustable, ball end retaining members 22. An equal plurality of strands 23 are mounted in spring biased, self retracting reels 24 on the upper strand supporting member 21. Each strand 23 is passed through a strand retaining pulley 25, which is mounted for radial adjustment on the upper strand supporting member 21 similarly to the mounting of the ball end retaining members 22 on the lower strand supporting member 20.

A ball 27, of a size to prevent it from passing through the opening of its pulley 25, but to fit into a lower ball end retaining member 22, is secured onto the free end of each strand 23. The upper and lower strand retaining members 22 and 25 may be adjusted radially, either individually or collectively, to position the strands 23 when extended in tension therebetween to define a duct form such as that 28 shown in FIG. 6.

A retractable, splined, drive shaft 29 holds the strand supporting members 20 and 21 in rotative register with each other, and with each strand retaining pulley 25 paired with a lower ball end retaining member 22. The spring biased reels 24 maintain a light, resilient tension on each strand, while permitting it to be drawn out, or to reel it in as required during set-up of the machine A.

A cone shaped strand clamp 30 is provided on a slidable, internally splined bearing 31 provided co-axially of upper strand supporting member 21 to grip all of the strands 23 when adjustment thereof is complete, after which the strand supporting members 20 and 21 may be axially separated by jack screws 32 to place the strands under desired tension. Thereafter, both strand supporting members 20 and 21 may be rotatably driven in unison, while suitable duct forming material, such as heat softened, thermo-plastic rod material 33 (FIG. 7) is wound thereon in the form of a closed helix, and is allowed to set or harden.

The ball ends 27 of the strands 23 are then released from their retaining members 22, and the cable clamp 30 is raised to free the strands 23 for retraction by their reels 24. The latter retract their respective strands to bring the ball ends 27 thereof into arrested engagement with their pulleys 25. The upper strand supporting member 21 is then raised by the jack screws 32 to clear the completed duct, and the splined shaft 29 is withdrawn upwardly to permit its removal.

Referring to the drawings in greater detail, the form A of the invention shown in FIG. 1 comprises a base portion 33 having a plate 34, which may be of suitable metal, such as steel plate, mounted upon four supporting legs 36. Each of the latter is provided with a grooved supporting wheel 35 at its lower end. These wheels 35 ride on parallel tracks 37, provided one along each side of the machine A. Suitable locking means, such as a set screw 38 (FIG. 1) retains the wheels 35 against rolling displacement on the tracks except when it is desired to move the base 33 therealong.

A grooved drive pulley 39, mounted on the shaft of an integral gear reduction type drive motor 40, drives a V-belt 41 which passes around the pulley 39 and also around a driven pulley 42 secured to the lower end of a socketed shaft 43. The latter is fitted co-axially into a hole provided therefor in the lower strand supporting member 20, and is secured therein by welding 44 (FIG. 1). The socketed shaft 43 is journaled in a bushing 45 provided in a bearing sleeve 47 welded at 48 in an axial opening provided therefor in the base-plate 34. The socketed shaft 43 is retained against axial displacement by collars 49 and 50, secured thereto by set screws.

A circular track 51, co-axial with the socketed shaft 43, and upper and lower strand supporting members 20 and 21, is secured as by welds 52 to the upper surface of the base plate 34, and guides a plurality of rollers 53 mounted on the lower edge of a cylindrical flange 54 which is welded co-axially to the underside of a metal disk 55 comprising the body portion of the lower strand supporting member 20.

A cylindrical collar 57 is secured co-axially to the upper side of the body disk 55, and is provided with a plurality of radially outwardly extending strand releasing pins 58, each of which is aligned with the ball end receiving bore 59 (FIGS. 8 and 9) of an associated, radially adjustable, ball end retaining member 22.

Each ball end retaining member is of generally "figure 8" cross sectional configuration, as best illustrated in FIGS. 8 and 9, and the bores 59 and 60 of the tubular upper and lower portions 62 and 63, respectively, thereof are axially parallel. A notch 61 is provided in the outer end of the upper side of the upper portion of each ball end receiving member 22 to provide clearance for the strand 23 when the ball end 27 thereof is inserted into the upper bore 60.

The lower bore 60 of each ball end retaining member 22 is threaded, and one thereof is threadedly mounted on each of a large plurality of threaded rods 64, each of which is journaled co-axially (FIGS. 1 and 8) within the tubular passage 65 provided in each track bar 67. The latter extend radially outwardly from the cylindrical pin support 57, and are secured by screws 68 to the upper surface of the body disk 55 of the lower strand supporting member 20. The number of radial track bars 67 provided is determined by the number of strands 23 required. For example, in the cable assembly indicated in FIG. 7, thirty-five radial track bars and their associated mechanisms would be required on each of the upper and lower strand supporting members 20 and 21. A reduced inner end portion of each threaded rod 64 is journaled in a block 69 which is secured to the inner end of each track bar 67, while a reduced outer end portion of each rod 64 is journaled in a ball bearing 66 mounted in a block 70 secured to the outer end of each track bar.

A slot 71 is provided lengthwise along the top of each track bar 67 and opens into the tubular passage therein. The lower tubular portion 63 of each ball end retaining member 22 fits slidably into the passage 65 of its associated track bar 67, while a restricted waist portion 72 thereof rides in the slot 71. The upper, ball end receiving tubular portion 62 projects above its associated track bar 67.

A worm gear 73 is journaled for rotation on the reduced outer end portion 74 of each threaded rod 64, and seats against the shoulder formed by the reduction in diameter of such outer end portion. A spring fingered clutch member 75, bears lightly and resiliently against the outer face of each worm gear 73, and is secured, co-axially, in threadedly adjusted position thereon, by a set screw 77 provided in a hub portion 78 thereof.

A non-circular socket 79 is provided in the outer end of the reduced portion 74 of each threaded rod 64 to receive a lug wrench (not shown) of a size to fit closely therein. Such wrench may be mounted on a conventional, reversible, electric motor driven driver for individual rotation of the threaded rods 64 when desired.

For adjusting all of the ball end retaining members 22 simultaneously, a plurality of worm pinions 80 are mounted on brackets 81 secured by screws 82 peripherally around the body disk 55. Each worm pinion 80 is in mesh with one of the worm gears 73. All but two of the worm pinions 80 are operatively interconnected by flexible couplings 83, which, as illustrated in FIGS. 4 and 5, are of conventional rubber sleeve type, and are mounted co-axially on projecting end portions 84 (FIG. 4) of endwise adjacent worm pinions 80.

A bevel pinion 85 (FIG. 4) is mounted on the end of one of the two non-coupled worm pinions 80, and is in mesh with a bevel drive pinion 87 the shaft of which is journaled in bearings 88 and 89 secured to the body disk 55. A non-circular socket 90 is provided in the outer end of the shaft 91 of the drive pinion 87 preferably of a size and shape to receive, in fitted relation therein, the same wrench as that used to drive the individual threaded rods 64. Thus, by driving the bevel pinions 85 and 87, all of the worm pinions 80 entirely around the strand supporting member 20 are driven in unison in the nature of a conventional flexible shaft. A template 92 for arranging the ball end retaining member 22 in a desired pattern may be mounted on the track bars 67, as shown in FIG. 4, preferably substantially co-axially of the strand supporting member 20, with the ball end retaining members 22 all positioned inwardly of such form.

The worm pinions 80 may then be simultaneously rotated, by a suitable lug wrench, (not shown) inserted in the bevel pinion socket 90, in a direction to drive the ball end retaining members 20 outwardly. As each ball end retaining member 20 engages the template 92, it is thereby arrested from further outward movement, whereupon the friction clutch 75 slips on its worm gear 73, and thus permits all of the other ball end retaining members 22 to be similarly driven outwardly until they also engage the template 92.

The upper strand supporting member 21, although relatively inverted, is similar in many respects to the lower one 20, and has many similar parts. Parts of the upper strand supporting member 21, which correspond to those of the lower one 20, will therefore, be identified by the same reference numerals, with the prime "'" added thereto. Among these generally similar parts are the body disk 55', cylindrical mounting flange 54', rollers 53' thereon, circular track 51', radial track bars 57', the threaded rods 64' journaled therein, worm pinions 80', worm gears 73' and bevel pinions 85' and 87'.

Instead of the ball end strand retaining members 22 of the lower strand supporting member 20, a strand retaining pulley member 25 is threadedly mounted on each of the rods 64', the pulley portion 94 thereof extending outwardly through the slot 71 in its associated track bar 67'.

Portions of the upper strand supporting member 21 which differ from those of the lower member 20 include the splined, sliding bearing 31, which is secured, as by welding 97, co-axially of the upper body disk 55', and is fitted for sliding, non-rotative movement on the splined shaft 29.

A fair-lead ring 98 is mounted co-axially on the under side of the upper body disk 55', and a shorter, cable clamping and fair-lead ring 99, of the same internal diameter as the lower one 98, is mounted co-axially therewith on the upper side of the body disk 55'. The free ends of both of these rings are rounded, as shown in FIG. 1, so that the cables will slide freely thereover, and holes 100 are provided in the body disk 55 in line with the inner walls of these rings 98 and 99 to allow each of the cable strands 23 to pass freely therethrough.

A spring biased reel 24 is mounted above each of the track bars 67', and has sufficient capacity to wind thereon all of the strand 23 with which it is associated. These reels may be generally similar to the well known spring biased reels which are used for containing an extensible clothes line, which permit a line wound thereon to be withdrawn therefrom for use, and which then re-wind the line thereon when the line is released. These reels 24 are also generally similar to the well known, spring biased, self retracting, pocket tape measures. Since such spring biased reels are well known, it will be unnecessary to illustrate or describe the details thereof herein.

For the strands 23 small, high strength, flexible cable, such as a 7 x 7, 1/16" stainless steel cable is satisfactory for a duct forming machine A wherein the diameter of the strand supporting members 20 and 21 is of the order of five feet. Suitable strand material for other sizes of machines may be readily selected by routine engineering procedures.

For simultaneously gripping all of the strands 23 prior to placing them under tension, the truncated, conical clamping ring 30 is mounted for axial, slidable movement on the internally splined sliding bearing 31. A pair of similar clamp actuating levers 101 are fulcrumed, respectively, on a pair of standards 103, fixedly mounted on diametrically opposite sides of the cylindrical supporting flange 54'. The inner end of each of these levers is pivotally connected to a bracket 104 mounted on the clamp ring 30. A coil spring 107, mounted in tension between each lever 101 and the body disk 55', urges these levers toward clamp-ring-elevating or releasing position. The pivot pin hole 108 in each clamp ring bracket 105 is slightly elongated, as shown in FIG. 1, to avoid binding.

A pair of axially elongated slotted holes 109 are provided in the mounting flange 54' to permit the levers 101 to pass therethrough, and a plurality of latch teeth 110, best illustrated in FIG. 6, are provided along one side of each of these slotted holes to engage the latching lever 101 mounted therein and hold it in clamping position. Each lever slot 109 is wide enough to permit the lever mounted therein to be moved transversely clear of the latching teeth 110. The clamping levers 101 are illustrated in solid lines in FIG. 1 in their clamp-ring-elevating, or strand releasing position. When the outer ends of these clamping levers are swung upwardly, they force the clamping ring 30 downwardly to clamp the strands 23 between the clamping ring 30 and the annular cable guide and clamping ring 99.

The upper mounting plate 34' having the upper annular roller track 51' welded thereto, is mounted on the lower ends of the four jack screws 32, each of which is provided with a threaded extension 112 of reduced diameter on its lower end. These extensions are fitted into holes provided therefor in the upper mounting plate 34', and nuts 113 are screwed onto these extensions to grip the plate 34' firmly.

A plurality of internally threaded sprockets 114 (FIGS. 1–3) are threadedly mounted, one on each of the jack screws 32, and a hub portion 115 of each sprocket 114 is journaled in a bearing 117 secured in axially upright position in a hole provided therefor in a stationary upper support plate 118. Each sprocket 114 is retained against axial displacement in its bearing by a collar 119, which is secured by a set screw 120 onto the lower end of each sprocket hub and bears against the lower end of its bearing. A drive chain 121 is in toothed driving engagement with all of the sprockets 114, and also with a drive sprocket 122 mounted on the drive shaft of a gear reduction type, reversible electric motor 123. The latter is secured to a fixed, top frame member 124, which may be an overhead beam, or the upper portion of a conventional machine frame not otherwise shown.

The splined shaft 29 is slidably mounted in an internally splined bearing sleeve 125, which in turn is journaled in a bushing 127 mounted in a tubular bearing support 128. The latter is mounted in a hole provided therefor in the top plate 34' co-axially of the socketed lower shaft 43 when the base 33 is positioned for forming a duct, and is secured therein by welding 129. A collar 130, secured to the internally splined sleeve 125 bears against the lower ends of both the bushing 127 and the bearing support 128 to secure the parts against axial displacement. This arrangement provides axially slidable journal support for the splined shaft 29.

Elevating means, such as a cable 131, allows the splined shaft 29 to be withdrawn upwardly to clear the space between the strand supporting members 20 and 21 for removing a duct after the latter has been formed on the strands 23. A hole 132 is also provided in the fixed upper frame member 124 to permit the splined shaft to pass upwardly therethrough.

In using the form A of the invention shown in FIG. 1, a template 92 having the required configuration for properly positioning the ball end retaining members 22 for making a required duct is mounted on the radial track bars 67, with the ball end retaining members 22 all positioned inwardly of the template. The latter preferably is retained against displacement during set-up as by means of conventional clamp means (not shown). The threaded rods 64 are then rotatively driven, as by means of a conventional stud wrench (not shown) inserted in the bevel pinion socket 90 (FIG. 4) to move all of the ball end retaining members 22 outwardly into arrested engagement with the template, which is then removed. The same, or another suitable template (not shown) of desired shape and size, may then be temporarily secured to the under surface of the upper track bars 67', after which the pulley members 25 are similarly moved outwardly into arrested engagement with such template. The templates used for positioning the ball end retaining and pulley members may be either of a divided, or hinged type, which separate to pass around the splined shaft 29 and then are clamped into their duct-end-defining shape, or they may be solid, one piece frames. In the latter case the splined shaft 29 is elevated sufficiently to permit such templates to pass therebeneath.

After the ball end retaining members 22 and the strand retaining pulley members 25 have been adjusted as required, the ball ends 27 on the strands 23, which at this stage of the procedure are drawn by their spring biased reels 24 into arrested engagement with their respective pulley members 25, are then drawn downwardly and inserted into the upper bores 59 of their respective ball end retaining members 22 directly therebeneath, the notch 61 in each ball end retaining member 22 permitting the strand to enter therein.

When all of the strands 23 have thus been retained in extended condition as shown in FIG. 1, the upper strand supporting member 21 is then raised or lowered by means of the motor driven sprockets 114 acting on the jack screws 32, to provide clearance for a required length of duct to be formed therebetween. The cable clamp 20 is then forced downwardly into clamping engagement with the strands 23 by raising the outer ends of the levers 101 and moving them laterally into selected teeth 110 (FIG. 6). With the strands 23 thus firmly clamped, the sprocket drive motor 123 is again actuated momentarily to elevate the upper strand supporting member 21 to thereby place the strands under desired tension.

The tensioned cable strands now define the interior of a duct section to be formed thereon. Suitable duct forming material, such as, for example, heat-softened thermoplastic rod 133, which may be extruded in a conventional manner from a mass (not shown) of heat-softened thermo-plastic material, can be wound on the form provided by the stretched and positioned strands 23. Alternately, if desired, a strip or layer of sheet, strand, or other type of duct forming material of any suitable duct forming material which will permit it to be wound or otherwise applied over such form, and to thereafter retain its shape as by setting, drying or hardening, would be suitable. Many types of suitable duct forming materials and methods of applying them to the duct form defining strands 23 will be obvious to an ordinarily skilled worker or engineer familiar with the art who may be practicing or considering the invention. Since the details of the duct material employed, and the specific manner of applying it to the strands are not material to the invention, such details will not be further enumerated or described herein.

After the selected duct forming material has been wound or otherwise applied over the form defined by the strands 23, and such material has set up or hardened sufficiently to permit it to be handled without destroying its shape, the levers 101 are lowered to their position shown in FIG. 1 to thereby free the clamping ring 30 and release the tension on the strands 23. The operatively interconnected worm pinions 80 of the lower strand supporting member 20 are then rotated, as by means of the bevel pinions 85 and 87 in a direction to move the ball end retaining members 22 radially inwardly.

As each ball retaining member 22 approaches its inward limit of movement, the strand releasing pin 58 aligned therewith enters the bore 59 and forces the ball end member 27 therein outwardly, free of its retaining member 22. Thereupon the spring biased reels 24 retract their respective strands 23 until the ball ends 27 are arrested by engagement with their respective pulley members 25. In the event that additional space is required to facilitate the removal of a completed duct section, such as that B shown in FIG. 7, the upper strand supporting member 21 is elevated by means of the jack screws 32. The splined shaft 29 is then withdrawn upwardly sufficiently to clear the space between the strand supporting members 20 and 21, and the completed duct section B is removed. The machine is then ready to be set up as described previously herein for the making of another duct section.

The modified form C of the invention shown in FIGS. 2 and 11 is less expensive to manufacture than that shown in FIG. 1, but it does not have the feature of being able to drive all of the cable retaining members on either strand supporting member simultaneously. However, many of its parts are similar, both in structure and operation, to those of the mechanism shown in FIG. 1. Such corresponding parts are, therefore, designated in FIGS. 2 and 11 with the same reference numerals as applied in FIG. 1, with the suffix "a" added. Since the shape and location of these substantially identical parts makes them easily identifiable, particularly when bearing corresponding reference numerals, it will be unnecessary to enumerate or describe them in detail herein. The principal differences between the forms of the invention shown in FIGS. 1 and 2 reside in the arrangement of the strands, and the positioning of the ball end retaining members and the strand retaining pulley members.

In the form C of the invention shown in FIG. 2, the track bars 67a are secured to the upper surface of the lower body disk 55a, and a modified ball end retaining member 140 (FIGS. 2 and 12) is mounted for longitudinal slidable movement in each track bar. Each ball end retaining member 140 is similar in exterior form, and in its upper, tubular, ball end receiving portion 62a, to the corresponding member 22 of FIG. 1. However, the lower portion 141 of the member 140, as best shown in FIG. 12 has a hole axially therethrough of a size to receive an actuating and anchoring strand 142 snugly therein. Each strand 142 passes through this hole and is securely anchored therein as by crimping or swaging, as at 143 (FIG. 11).

Each strand 142 extends radially both inwardly and outwardly from its ball end retaining member 140 (FIGS. 2 and 11). The inwardly extending portion thereof passes through the bore of the track bar 67a associated therewith, and thence passes through a hole provided therefor in the cylindrical pin support 57a and over a curved fair lead ring 144 mounted co-axially of the body disk 55a. Thence it passes through a hole 145 provided therefor in the body disk 55a, and then downwardly between a truncated, slidable, conical strand clamping ring 147 and a fixed ring 148 secured co-axially to the under side of the body disk 55a. The ring 147 is actuated by levers 146 generally similar to the levers 101 of FIG. 1. Each strand 142 then passes around a bracket pulley 150 on the lower end of the fixed ring 148, and is wound on a spring biased reel 151, similar to the reels 24 of FIG. 1.

An outward prolongation of each strand 142 passes around a bracket pulley 152 mounted on the periphery of the body disk 55a and thence extends angularly downwardly and is wound on a second spring biased reel 153 mounted on the outer side of the support flange 54a. A cam-action clamp 154 is provided for the outward prolongation of each strand 142 to anchor its ball end retaining member 22a against inward displacement when the duct form strands 23a are placed under tension, and during the subsequent application of duct forming material thereon.

The upper strand support member 21a is generally similar to the corresponding member 21 of FIG. 1, with the exception that the strand retaining pulley members 25a are each connected to the base portion of their strand retaining pulleys 25a similarly to the strand 142 in FIG. 11. Each anchoring strand 155 extends outwardly through its associated track bar, around the bracket mounted pulley 152', and thence to the spring biased reel 153', similarly to the outwardly extending portion of the strands 142 of the lower strand supporting member 20a. A cam action clamp 154' is also provided for anchoring each strand 155 similarly to the action of clamp 154 for the strand 142.

The operation of the form C of the invention shown in FIG. 2 is generally similar to that of FIG. 1, with the exception that when setting up the ball end retaining members 22a and the strand retaining pulley members 25a, for example, by means of a template such as that 92 of FIG. 4, the strands must be released by their various clamping means, and the ball end retaining and pulley members must be moved manually along their respective track bars, either by grasping the retaining members directly, or by grasping the strands connected thereto.

After the ball end and pulley retaining members have been moved to their required positions along their track bars 67a, the conical cable rings 30a and 147 are moved to their cable clamping position by means of their respective actuating levers, and the cam action cable clamps 154 and 154' are also swung to their strand clamping positions to thereby clamp the strands 23a, 142 and 155 and anchor their respective strand retaining members against displacement. The remainder of the operation of the duct forming mechanism C of FIGS. 2 and 11 is substantially identical to that of the mechanism A of FIG. 1, and will be obvious to anyone familiar with the art who has read and understood the description herein of the mechanism A.

To make a duct section having one end thereof offset laterally from the other end thereof, as shown in FIGS. 12 and 13, a duct skeleton or frame in the form of an open helix is first made on the strands set up as described previously herein. Such a helical form is shown, for example, at 160 in FIG. 12. For the purpose of the present description it is assumed that the helix 160 has been made on the machine A of FIG. 1. After the winding of the helix 160 and releasing the strands 23 for retraction onto their respective reels 24, the upper and lower ends of the helix 160 may be secured as by conventional clamps, not shown, to the upper and lower strand supporting members 20 and 21 respectively.

The base anchoring set screw 38 is released, and the wheel supported base 33, with the lower strand supporting member 20 thereon, is moved along its tracks 37 a required distance to produce the desired offset between the opposite ends of the skeleton helix 160. The helix will then appear substantially as shown in FIG. 13, and can be exclosed with suitable duct forming material, such as, for example, glass fiber tape saturated with unset polyester resin. After the duct forming material (not shown) applied over the offset helix has set up or hardened, the ends of the thus enclosed helical skeleton 160 can be released from the cable strand supporting members 20 and 21 and the completed duct section removed.

The invention provides a simple and versatile duct forming mechanism, which has broad utility in many industries and arts. It provides for the rapid, simple, accurate and inexpensive manufacture of ducts of a wide variety of shapes and materials. After a brief period of instruction, even a relatively unskilled operator is able by its use to make duct sections of great complexity, and which would otherwise require the services of a highly skilled artisan by means of conventional tools, mechanisms and methods. Also, once the necessary template has been made for each end of a required duct, such duct can be reproduced as often as may be desired with relative speed, accuracy and economy.

While I have illustrated and described a preferred embodiment of the present invention, and one modified form thereof, it will be understood, however, that various changes and modifications may be made in the details thereof without departing from the scope of the invention as set forth in the appended claims.

Having thus described the invention what I claim as new and desire to protect by Letters Patent is defined in the following claims:

1. A duct forming mechanism comprising:
   (a) a pair of strand supporting members mounted in opposed, spaced relation,
   (b) a plurality of adjustable strand retaining elements mounted on each strand supporting member,
   (c) each strand retaining element on one strand supporting member being paired with one thereof on the other strand supporting member,
   (d) means for extending a strand between each of the strand retaining elements on one stand supporting member and the strand retaining element paired therewith, thereby to define a form for a duct section,
   (e) means for tensioning the strands extending between their respective retaining elements to support a layer of duct forming material applied to the form defined by the tensioned strands to thereby provide a duct section, and
   (f) means for removing a duct section formed by applying duct forming material over the form thus defined from the strands and from the space between the strand supporting members.

2. A duct forming mechanism comprising:
   (a) a pair of strand supporting members mounted in opposed, spaced relation,
   (b) a plurality of adjustable strand retaining elements mounted on each strand supporting member,
   (c) each strand retaining element on one strand supporting member being paired with one thereof on the other strand supporting member,
   (d) means for extending a strand between each of the strand retaining elements on one strand supporting member and the strand retaining element paired therewith, thereby to define a form for a duct section
   (e) means for tensioning the strands extending between their respective retaining elements to support a layer of duct forming material applied to the form defined by the tensioned strands to thereby provide a duct section
   (f) means for releasing the strands from the strand retaining elements on one strand supporting member,
   (g) biased means mounted on one of the strand supporting members and connected to each strand for withdrawing the strands from the space between the strand supporting elements upon their release by the strand releasing means, and
   (h) means for removing a duct section formed by applying duct forming material over the form thus defined from the strands and from the space between the strand supporting members.

3. A duct forming mechanism comprising:
   (a) a pair of strand supporting members mounted in opposed, spaced relation,
   (b) a plurality of adjustable strand retaining elements mounted on each strand supporting member,
   (c) each strand retaining element on one strand supporting member being paired with one thereof on the other strand supporting member,
   (d) means for adjusting the strand retaining elements on each strand supporting member toward and away from a common center,
   (e) means for extending a strand between each of the strand retaining elements on one strand supporting member and the strand retaining element paired therewith, thereby to define a form for a duct section,
   (f) mean for tensioning the strands extending between their respective retaining elements to support a layer of duct forming material applied to the form defined by the tensioned strands to thereby provided a duct section,
   (g) means for removing a duct section formed by applying duct forming material over the form thus defined from the strands and from the space between the strand supporting members.

4. A duct forming mechanism comprising:
   (a) a pair of strand supporting members mounted in opposed, co-axial, axially spaced relation,
   (b) a plurality of radially adjustable strand retaining elements mounted on each strand supporting member,
   (c) each strand retaining element on one strand supporting member being paired with one thereof on the other strand supporting member,
   (d) means for extending a strand under tension between each of the strand retaining elements on one strand supporting member and the strand retaining element paired therewith, thereby to define a form for a duct section, the strands being tensioned sufficiently to support a layer of duct forming material applied to the form defined by the tensioned strands to thereby provide a duct section, and
   (e) means for removing a duct section formed by applying duct forming material over the form thus defined from the strands and from the space between the strand supporting members.

5. A duct forming mechanism comprising:
   (a) a pair of rotary strand supporting members mounted in opposed, co-axial, axially spaced relation,
(b) a plurality of radially adjustable strand retaining elements mounted on each supporting member,
(c) each strand retaining element on one strand supporting member being paired with one thereof on the other strand supporting member,
(d) means for extending a strand between each of the strand retaining elements on one strand supporting member and the strand retaining element paired therewith, thereby to define a form for a duct section,
(e) means for tensioning the strands extending between their respective retaining elements to support a layer of duct forming material applied to the form defined by the tensioned strands to thereby provide a duct section,
(f) means for simultaneously rotating both strand supporting members about their common axis while applying a layer of duct forming material on the form defined by the tensioned strands, and
(g) means for removing a completed duct section thus formed from the strands and from the space between the strand supporting members.

6. A duct forming mechanism comprising:
(a) a pair of strand supporting members mounted in opposed, spaced relation,
(b) controlled means for moving the strand supporting means toward and away from each other,
(c) a plurality of adjustable strand retaining elements mounted on each strand supporting member,
(d) each strand retaining element on one strand supporting member being paired with one thereof on the other strand supporting member,
(e) means for extending a strand between each of the strand retaining elements on one strand supporting member and the strand retaining element paired therewith, thereby to define a form for a duct section
(f) means for tensioning the strands extending between their respective retaining elements to support a layer of duct forming material applied to the form defined by the tensioned strands to thereby provide a duct section
(g) means for releasing the strands from the strand retaining elements on one strand supporting member,
(h) means mounted on one of the strand supporting members and connected to each strand for withdrawing the strands upon their release by the strand releasing means, and
(i) means for removing a duct section formed by applying duct forming material over the form thus defined from the strands and from the space between the strand supporting members.

7. An arrangement according to claim 6 wherein the strand supporting means are rotatable about a common axis.

8. An arrangement according to claim 7 wherein the strand retaining elements are adjustable radially inwardly and outwardly relative to the common axis of rotation of the strand supporting members.

9. A duct forming mechanism comprising:
(a) a pair of rotary strand supporting members mounted in opposed, co-axial, axially spaced relation,
(b) controlled means for moving the strand supporting means toward and away from each other,
(c) a plurality of radially adjustable strand retaining elements mounted on each supporting member,
(d) each strand retaining element on one strand supporting member being paired with one thereof on the other strand supporting member,
(e) means for extending a strand between each of the strand retaining elements on one strand supporting member and the strand retaining element paired therewith, thereby to define a form for a duct section,
(f) means for clamping the strands in extended condition between their respective retaining elements for tensioning by moving the strand supporting members away from each other,
(g) means for simultaneously rotating both strand supporting members about their common axis while applying a layer of duct forming material on the form defined by the strands, and
(h) means for removing a completed duct section thus formed from the strands and from the space between the strand supporting members.

10. An arrangement according to claim 9 wherein, upon completing of an initial, rotating, duct winding operation, one of the strand supporting members is movable transversely of its axis of rotation to thereby offset a duct formed on the strands when extended between the strand supporting members.

11. A duct forming mechanism comprising:
(a) a pair of rotary strand supporting members mounted in opposed, co-axial, axially spaced relation,
(b) a plurality of spring biased reels on one strand supporting member,
(c) a plurality of radially adjustable strand retaining elements mounted on each strand supporting member,
(d) a strand wound on each reel and passed in guided relation through one strand retaining element on said one strand supporting member,
(e) a ball end on the free end of each strand,
(f) each strand retaining element on the other strand supporting member being formed to receive and releasably retain one of the strand ball ends,
(g) means for simultaneously rotating both strand supporting members about their common axis with the strands extending between the strand supporting member while applying a layer of duct forming material on the form defined by the strands, and
(h) means for removing a completed duct section thus formed from the strands and from the space between the strand supporting members.

12. A duct forming mechanism comprising:
(a) a pair of rotary strand supporting members mounted in opposed, co-axial, axially spaced relation,
(b) a plurality of spring biased reels on one strand supporting member,
(c) a plurality of radially adjustable strand retaining elements mounted on each strand supporting member,
(d) a strand wound on each reel and passed in guided relation through one strand retaining element on said one strand supporting member,
(e) a ball end on the free end of each strand,
(f) each strand retaining element on the other strand supporting member being formed to receive and releasably retain one of the strand ball ends,
(g) means for simultaneously rotating both strand supporting members about their common axis with the strands extending between the strand supporting member while applying a layer of duct forming material on the form defined by the strands, and
(h) a radially directed element radially inwardly of each strand retaining element on the other strand supporting member and formed and positioned to release a strand ball end retained in such strand retaining element upon a selected movement of each strand retaining element radially inwardly.

References Cited by the Examiner

UNITED STATES PATENTS

| | | | |
|---|---|---|---|
| 2,725,090 | 11/1955 | Runton et al. | 156—426 |
| 2,797,728 | 7/1957 | Slayter et al. | 156—431 X |
| 3,164,509 | 1/1965 | Olken | 156—426 |

EARL M. BERGERT, *Primary Examiner.*

M. L. KATZ, *Assistant Examiner.*